(12) United States Patent
Wagener et al.

(10) Patent No.: US 6,890,476 B2
(45) Date of Patent: May 10, 2005

(54) FIBER-REINFORCED COMPOSITES AND METHOD FOR THE PRODUCTION THEREOF

(75) Inventors: Gert Wagener, Emsdetten (DE);
Carsten Schoeppinger, Salzgitter (DE);
Jens Kleffmann, Braunschweig (DE);
Markus Kleineberg, Hemmingen (DE);
Arno Pabsch, Braunschweig (DE);
Christof Sigle, Braunschweig (DE)

(73) Assignee: Saertex Wagener GmbH & Co. KG, Saerbeck (DE)

( * ) Notice: Subject to any disclaimer, the term of this patent is extended or adjusted under 35 U.S.C. 154(b) by 0 days.

(21) Appl. No.: 10/654,929

(22) Filed: Sep. 5, 2003

(65) Prior Publication Data

US 2004/0053028 A1 Mar. 18, 2004

Related U.S. Application Data

(63) Continuation of application No. 09/585,284, filed on Jun. 2, 2000, now abandoned.

(30) Foreign Application Priority Data

Jun. 4, 1999 (DE) .......................................... 199 25 588

(51) Int. Cl.$^7$ ................................................. H05B 6/00
(52) U.S. Cl. ........................ 264/478; 264/494; 264/500; 264/519; 264/548; 264/552; 264/240; 264/345; 264/344
(58) Field of Search ................................. 264/478, 494, 264/500, 519, 548, 552, 240, 344, 345

(56) References Cited

U.S. PATENT DOCUMENTS

| | | | |
|---|---|---|---|
| 4,374,177 A | * 2/1983 | Hsu et al. ................... 428/392 |
| 4,394,418 A | * 7/1983 | Temple ....................... 428/391 |
| 4,649,080 A | 3/1987 | Fischer et al. |
| 5,316,820 A | 5/1994 | Harpell et al. |
| 5,376,426 A | 12/1994 | Harpell et al. |
| 5,948,503 A | 9/1999 | Yamamoto et al. |
| 5,948,706 A | * 9/1999 | Riedel et al. .................. 442/59 |

FOREIGN PATENT DOCUMENTS

| | | |
|---|---|---|
| DE | 34 16 855 A1 | 11/1985 |
| EP | 0 302 989 A2 | 2/1989 |
| EP | 0 310 200 A2 | 4/1989 |
| EP | 0 628 401 A1 | 12/1994 |
| FR | 2 594 858 A1 | 8/1987 |

* cited by examiner

*Primary Examiner*—Merrick Dixon
(74) *Attorney, Agent, or Firm*—Foley & Lardner LLP

(57) ABSTRACT

A thread or other element for bonding fibers in a fibrous reinforcement for use in a fiber composite is such that it is at least degraded in the course of the production of said fiber composite.

29 Claims, No Drawings

FIBER-REINFORCED COMPOSITES AND METHOD FOR THE PRODUCTION THEREOF

The present application is a continuation of U.S. application Ser. No. 09/585,284, filed Jun. 2, 2000, now abandoned the entire contents of which are incorporated herein by reference.

BACKGROUND OF THE INVENTION

The invention relates to a fibrous reinforcement for use in fiber composites wherein crossover points of fibers are bonded together using threads or other elements. The invention relates also to a process for producing fiber composites comprising a matrix material and a fibrous reinforcement embedded in the matrix material, wherein the fibers in the fibrous reinforcement are bonded together using threads or other elements.

Fiber composites are materials comprising a matrix material, for example, a polymer matrix as a continuous phase, and embedded reinforcing fibers as a discontinuous phase. The reinforcing fibers bound into the matrix material improve the properties of the matrix material, i.e., of the plastic. More particularly, the strength and stiffness of the material can be advantageously modified.

The fibrous reinforcement used is typically in the form of a sheetlike arrangement of fibers. Sheetlike arrangements of fibers are also known as textile sheet materials or fabrics and can be subdivided into three groups:

a) webs;
b) noninterlooping systems (wovens, scrims, braids);
c) interlooping systems (loop-formed knits, loop-drawn knits).

Depending on the method used to construct or produce these sheet materials, the fixation of the actual reinforcing fibers takes different forms. Owing to their structure, for example, loop-drawn knits, loop-formed knits and wovens normally require no additional fixation. Webs, in contrast, may be needled or fixed (bonded) by means of a binder. Nonwoven scrims, which are formed by superposition of differently oriented fiber or filament systems, require fixation of the crossover points of individual fibers to be handleable.

After impregnation and curing or solidification of the matrix material, the "thread" (which, as used herein, can include other fixation elements) is still present in fiber form in the composite as an additional phase and accordingly possesses an interface with the matrix material.

It has been determined that the thread may be an imperfection and a possible initiation point for damage, owing to the different physical properties of the thread material, compared with the matrix material and compared with the actual reinforcing material, and owing to possibly inadequate attachment of the thread to the matrix material. If, as a result of the thread having an interfacial area, the surface of the stitching thread becomes detached from the matrix material, it is likely that, similarly to other pores, dynamic stress on the fiber composite will lead to areas of damage emanating from the thread and possibly to complete failure of the fiber assembly.

Furthermore, matrix materials where the infiltration or curing requires that they be exposed to an elevated temperature above room temperature or above the storage temperature of the fibrous reinforcement are problematical in that, beyond a certain temperature, the shrinkage tendencies of the thread will be responsible for distortions or distensions being introduced into the actual reinforcing fibers as a function of the mechanical and/or thermal processing history of the thread. This risk of the fibrous reinforcement being distorted is always present when the thread undergoes shrinkage prior to the actual gelling or solidifying of the matrix material.

SUMMARY OF THE INVENTION

It is therefore one object of the present invention to provide an improved fibrous reinforcement for use in producing fiber-reinforced composites.

Another object of the invention is to provide improved fiber-reinforced composites.

It is also and object of the invention to provide a process or method for producing the improved fiber-reinforced composites.

In accomplishing the foregoing objects, there has been provided according to one aspect of the present invention a fiber-reinforced composite material, comprising a solid matrix material having dispersed therein a fibrous reinforcement, wherein the fibrous reinforcement comprises a plurality of fibers that were at one time bonded together at spaced points by at least one bonding element, wherein the bonding element is at least substantially degraded in the course of making the composite material, at the latest upon the solidification of the matrix material. Preferably, degradation has occurred to the extent that there is substantially no distortions or distensions introduced into the composite material in the course of the manufacturing process, and most preferably to the extent that there is substantially no interfacial area between the bonding element and matrix material in the fiber-reinforced composite material.

In accordance with another aspect of the invention, there has been provided a fibrous reinforcement for use in forming a fiber-reinforced composite material having the fibrous reinforcement encapsulated within a solidified matrix material, wherein the fibrous reinforcement comprises a plurality of fibers that are bonded together at spaced crossover points by at least one bonding element that is at least substantially degraded in the course of making the composite material, at the latest upon the solidification of the matrix material.

In accordance with yet another aspect of the invention, there has been provided a process for producing a fiber-reinforced composite material having the fibrous reinforcement encapsulated within a solidified matrix material, comprising:

(a) placing into a mold cavity a fibrous reinforcement comprising a plurality of fibers that are bonded together at spaced points by at least one bonding element;
(b) injecting into the mold cavity the matrix material or a precursor to the matrix material, in flowable form, to surround the fibrous reinforcement with the matrix material; and
(c) solidifying the matrix material to form the composite material, further comprising, after step (a), at least substantially degrading the bonding element in the course of making the composite material, at the latest upon the solidification of the matrix material.

Further objects, features and advantages of the present invention will become apparent from the detailed description of preferred embodiments that follows.

DETAILED DESCRIPTION OF PREFERRED EMBODIMENTS

According to the invention, threads or other bonding elements are at least substantially degraded in the course of the production of the fiber-reinforced composite. One possibility is to decompose the threads after the fibrous reinforcement has been incorporated into the matrix material. The only purpose of the threads, therefore, is to render the fibrous reinforcement conveniently handleable prior to encapsulation in the matrix material.

The degrading or decomposing of the threads may be accomplished by the appropriate choice of the thread material, so that the threads dissolve in the matrix material. For each matrix material, it is thus necessary to select a suitable thread material which, in addition, has sufficient mechanical strength to initially fix or hold together the reinforcing fibers of the fibrous reinforcement.

It is also conceivable to select a thread material such that the threads melt at a temperature which is above the room or storage temperature of the fibrous reinforcement and which can be as high as the temperature for manufacturing the fiber composite. The melting point of the threads can be, for example, equal to the curing temperature of the matrix material or equal to the temperature for impregnating the fiber composite.

Thread materials which melt at the impregnation temperature are advantageously copolymers, especially copolymers based on polyamide or polyester.

In a corresponding process for producing fiber-reinforced composites, the threads degrade when the fibrous reinforcement is bound or incorporated into the matrix material.

As a result of the thread dissolving in the matrix material, the thread is not present in the fiber composite as a separate phase. It can accordingly not act as an imperfection and as a possible initiation point for damage, which is the case with conventional threads that possess an interface with the matrix material. Furthermore, the dissolving of the thread avoids distortions or distensions of the fibrous reinforcement of the kind which can arise in the case of conventional threads as a result of the shrinkage tendencies of the threads at elevated manufacturing temperatures of the fiber composite. This benefit is achieved already if the thread is at least degraded, i.e., not completely decomposed.

Furthermore, appropriate compatibility of the stitching thread material with the matrix material makes it possible to improve the material characteristics of the fiber composite under impact stress.

The invention will now be more particularly described with reference to specific aspects and examples.

To improve handling, fibrous reinforcement is bonded together at crossover points of individual fibers using bonding elements, preferably in the form of threads. This makes it possible to fix the fibrous reinforcement in certain shapes and to drape the fibrous reinforcement in corresponding fashion. In addition, such a thread-fixed nonwoven scrim of fiber mats is easier to transport as a result of the crossover points being fixed or bonded together. Thus, various types of bonding elements can be used, including, for example, adhesive spots, staples, docking holes, and the like.

To produce fiber composites, preferably a thread-fixed fibrous reinforcement is introduced into a matrix material. The matrix material can be, for example, a thermosetting binder such as PF (phenol-formaldehyde), MF (melamine-formaldehyde), UF (urea-formaldehyde), UP (polyester) and EP (expoxide) resins. It is also possible to use thermoplastic binders, such as PA (polyamide), PC (polycarbonate), POM (polyoxymethylene), PET (polyethylene terephthalate), PBT (polybutylene terephthalate), PP (polypropylene) and ABS (acrylonitrile-butadiene-styrene copolymer) resins. Embedding the fibrous reinforcement in these polymer materials improves especially the mechanical and thermal properties of the base material, for example, the tensile and breaking strength, the modulus of elasticity, the heat resistance and the dimensional stability. The improvement in these properties which is attainable in any particular case depends on the adhesion between the matrix material and the fibrous reinforcement, i.e., on the processes at the boundary layer. It is therefore proposed that the threads which are necessary for fixing the fibrous reinforcement are at least degraded and are preferably decomposed in the fiber composite and thus are no longer able to form a boundary layer.

One way for the threads to be decomposed is for them to dissolve in the matrix material. It is also advantageous to use combinations of thread materials with matrix materials in which the thread materials melt at the curing temperature of the matrix material. It is further advantageous to use combinations of thread materials and matrix materials where the thread material melts at the temperature for impregnating the fiber composite.

In one preferred embodiment of the invention, fiber-reinforced composites are produced utilizing a multi-axial fabric (non-scrimmed fabric) made of carbon fibers having a basis weight of about 1000 g/m$^2$. The layers of fiber forming the fabric are stitched using thin threads (about 70 dtex). The thin threads are made of copolyester K-110 material available from EMS-Chemie of CH-7013 Donat/Ems. The melting temperature of the thread material is about 120° C. Upon incorporation into a higher melting matrix polymer, the copolyester threads are melted and are intimately combined with the matrix material and are therefore essentially dissolved.

In accordance with another preferred embodiment of the invention, a similar fabric was employed as the reinforcing material, except in this case the threads used to stitch the fabric were made of polyvinyl alcohol (PVAL), which is water soluble and is washed out of the fabric layer by a washing step after it is inserted into the mold but before the matrix material is injected.

Although the invention has been described and illustrated with reference to preferred embodiments thereof, it will be appreciated by those skilled in the art that the invention can be practiced in the form of other embodiments. It is intended that all obvious equivalents to the disclosed embodiments will be covered by the appended claims.

The entire disclosure of German Patent Application No. 199 25 588.1-43, filed Jun. 4, 1999, is hereby incorporated by reference into the present application.

What is claimed is:

1. A process for producing a fiber-reinforced composite material having the fibrous reinforcement encapsulated within a solidified matrix material, comprising:

(a) placing into a mold cavity a fibrous reinforcement comprising a plurality of fibers that are bonded together at spaced points by at least one bonding element;

(b) injecting into the mold cavity the matrix material or a precursor to the matrix material, in flowable form, to surround the fibrous reinforcement with the matrix material; and (c) solidifying the matrix material to form the composite material, wherein, after (a), at least substantially degrading the bonding element in the course of making the composite material, at the latest upon the solidification of the matrix material.

2. A process for producing a fiber-reinforced composite material according to claim 1, wherein the bonding element is dissolved in the matrix material or precursor to the matrix material.

3. A process for producing a fiber-reinforced composite material according to claim 1, wherein the bonding element is melted at the temperature at which the injecting is carried out.

4. A process for producing a fiber-reinforced composite material according to claim 1, wherein the solidifying of the matrix material comprises heating the matrix to a solidification temperature, and wherein the bonding element is melted at the solidifying temperature.

5. A process for producing a fiber-reinforced composite material according to claim 1, wherein the bonding element comprises a water soluble polymer, and the process further includes dissolving away the bonding element with an aqueous liquid prior to the injecting into the mold cavity of the matrix material or a precursor to the matrix material, in flowable form, to surround the fibrous reinforcement with the matrix material.

6. A process for producing a fiber-reinforced composite material according to claim 1, wherein the matrix material comprises a polymeric material having a first melting temperature, and the bonding element comprises a polymer having a melting temperature that is lower than the first melting temperature.

7. A process for producing a fiber-reinforced composite material according to claim 1, wherein the matrix material comprises a thermosetting polymeric material having a minimum curing temperature, and the bonding element comprises a polymer having a melting temperature that is lower than the minimum curing temperature.

8. A process for producing a fiber-reinforced composite material having the fibrous reinforcement encapsulated within a solidified matrix material, comprising:
   (a) placing into a mold cavity a fibrous reinforcement comprising a plurality of fibers that are bonded together at spaced points by at least one bonding element;
   (b) injecting into the mold cavity the matrix material or a precursor to the matrix material, in flowable form, to surround the fibrous reinforcement with the matrix material; and
   (c) solidifying the matrix material to form the composite material,
wherein, after step (a), at least substantially degrading the bonding element in the course of making the composite material, at the latest upon the solidification of the matrix material, the degrading being carried out to at least an extent that there is substantially no interfacial area between the bonding element and matrix material in the fiber-reinforced composite material.

9. A process for producing a fiber-reinforced composite material according to claim 8, wherein the bonding element is dissolved in the matrix material or precursor to the matrix material.

10. A process for producing a fiber-reinforced composite material according to claim 8, wherein the bonding element is melted at the temperature at which the injecting is carried out.

11. A process for producing a fiber-reinforced composite material according to claim 8, wherein the solidifying of the matrix material comprises heating the matrix to a solidification temperature, and wherein the bonding element is melted at the solidifying temperature.

12. A process for producing a fiber-reinforced composite material according to claim 8, wherein the bonding element comprises a water soluble polymer, and the process further includes dissolving away the bonding element with an aqueous liquid prior to the injecting into the mold cavity of the matrix material or a precursor to the matrix material, in flowable form, to surround the fibrous reinforcement with the matrix material.

13. A process for producing a fiber-reinforced composite material according to claim 8, wherein the matrix material comprises a polymeric material having a first melting temperature, and the bonding element comprises a polymer having a melting temperature that is lower than the first melting temperature.

14. A process for producing a fiber-reinforced composite material according to claim 8, wherein the matrix material comprises a thermosetting polymeric material having a minimum curing temperature, and the bonding element comprises a polymer having a melting temperature that is lower than the minimum curing temperature.

15. A process for producing a fiber-reinforced composite material according to claim 14, wherein the matrix material is cured at a curing temperature, and the bonding element has been at least partially melted at the curing temperature of said matrix material.

16. A process for producing a fiber-reinforced composite material according to claim 8, wherein the bonding element is completely structurally destroyed in the fiber-reinforced composite material.

17. A process for producing a fiber-reinforced composite material according to claim 8, wherein the matrix polymer is selected from the group consisting of PF (phenol-formaldehyde), MF (melamine-formaldehyde), UF (urea-formaldehyde), UP (polyester), EP (epoxide), PA (polyamide), PC (polycarbonate), POM (polyoxymethylene), PET (polyethylene terephthalate), PBT (polybutylene terephthalate), PP (polypropylene) and ABS (acrylonitile-butadiene-styrene copolymer) resins.

18. A process for producing a fiber-reinforced composite material having the fibrous reinforcement encapsulated within a solidified matrix material, comprising:
   (a) bonding together a plurality of fibers of a fibrous reinforcement at spaced points by at least one bonding element
   (b) placing the fibrous reinforcement into a mold cavity;
   (c) injecting into the mold cavity the matrix material or a precursor to the matrix material, in flowable form, to surround the fibrous reinforcement with the matrix material; and
   (d) solidifying the matrix material to form the composite material,
wherein, after step (a), at least substantially degrading the bonding element in the course of making the composite material, at the latest upon the solidification of the matrix material, the degrading being carried out to at least an extent that there is substantially no interfacial area between the bonding element and matrix material in the fiber-reinforced composite material.

19. A process for producing a fiber-reinforced composite material according to claim 18, wherein the bonding element is dissolved in the matrix material or precursor to the matrix material.

20. A process for producing a fiber-reinforced composite material according to claim 18, wherein the bonding element is melted at the temperature at which the injecting is carried out.

21. A process for producing a fiber-reinforced composite material according to claim 18, wherein the solidifying of the matrix material comprises heating the matrix to a solidification temperature, and wherein the bonding element is melted at the solidifying temperature.

22. A process for producing a fiber-reinforced composite material according to claim 18, wherein the bonding element comprises a water soluble polymer, and the process further includes dissolving away the bonding element with an aqueous liquid prior to the injecting into the mold cavity of the matrix material or a precursor to the matrix material, in flowable form, to surround the fibrous reinforcement with the matrix material.

23. A process for producing a fiber-reinforced composite material according to claim 18, wherein the matrix material comprises a polymeric material having a first melting temperature, and the bonding element comprises a polymer having a melting temperature that is lower than the first melting temperature.

24. A process for producing a fiber-reinforced composite material according to claim 18, wherein the matrix material comprises a thermosetting polymeric material having a minimum curing temperature, and the bonding element comprises a polymer having a melting temperature that is lower than the minimum curing temperature.

25. A process for producing a fiber-reinforced composite material according to claim 8, wherein the bonding element comprises a thread.

26. A process for producing a fiber-reinforced composite material according to claim 8, wherein the bonding element comprises a copolymer.

27. A process for producing a fiber-reinforced composite material according to claim 26, wherein the copolymer comprises a polyamide or a polyester.

28. A process for producing a fiber-reinforced composite material according to claim 8, wherein the matrix material comprises a polymer.

29. A process for producing a fiber-reinforced composite material according to claim 8, wherein the bonding element is only partially degraded.

* * * * *